US009182211B2

(12) United States Patent
Jones et al.

(10) Patent No.: US 9,182,211 B2
(45) Date of Patent: Nov. 10, 2015

(54) FIELD INTERCHANGABLE BORESIGHT MOUNTING SYSTEM AND CALIBRATION METHOD

(71) Applicant: Honeywell International Inc., Morristown, NJ (US)

(72) Inventors: Ralph R. Jones, Coon Rapids, MN (US); Douglas Mark Weed, Forest Lake, MN (US); David Robert Storch, Springfield, OH (US)

(73) Assignee: Honeywell International Inc., Morristown, NJ (US)

( * ) Notice: Subject to any disclaimer, the term of this patent is extended or adjusted under 35 U.S.C. 154(b) by 401 days.

(21) Appl. No.: 13/693,278

(22) Filed: Dec. 4, 2012

(65) Prior Publication Data
US 2013/0139566 A1    Jun. 6, 2013

Related U.S. Application Data

(60) Provisional application No. 61/567,279, filed on Dec. 6, 2011.

(51) Int. Cl.
*G01B 5/25* (2006.01)
*F41G 3/32* (2006.01)
*G01C 25/00* (2006.01)

(52) U.S. Cl.
CPC .. *G01B 5/25* (2013.01); *F41G 3/32* (2013.01); *G01C 25/005* (2013.01)

(58) Field of Classification Search
CPC ........................................................ G01B 5/25
USPC ......... 73/1.37, 1.38, 1.75, 1.77, 1.78; 702/92, 702/150–153, 189; 33/313, 324
See application file for complete search history.

(56) References Cited

U.S. PATENT DOCUMENTS 3,816,935 A  6/1974  Wilmot
3,955,468 A  5/1976  Romilly
(Continued)

FOREIGN PATENT DOCUMENTS

FR    2618920    2/1989

OTHER PUBLICATIONS

European Patent Office, "Office Action", "from Foreign Counterpart of U.S. Appl. No. 11/925,440", Apr. 28, 2009, pp. 1-20, Published in: EP.

(Continued)

*Primary Examiner* — Hezron E Williams
*Assistant Examiner* — Hoang Nguyen
(74) *Attorney, Agent, or Firm* — Fogg & Powers LLC

(57) ABSTRACT

A calibration method comprises providing a mounting fixture including a tray coupled to a frame, and an alignment measurement sensor removably coupled to the tray. An angular orientation of the tray is determined using the alignment measurement sensor removably coupled to the tray in a first position. The alignment measurement sensor is then moved to a second position on the tray that is rotated from the first position, and the angular orientation of the tray is determined using the alignment measurement sensor at the second position. An axis misalignment for at least two of a pitch axis, a roll axis, or a yaw axis of the alignment measurement sensor is then calculated to determine one or more misalignment factors. The one or more misalignment factors are then applied to correct for misalignment of the alignment measurement sensor.

20 Claims, 2 Drawing Sheets

(56) References Cited

U.S. PATENT DOCUMENTS

| | | | |
|---|---|---|---|
| 4,495,850 A | 1/1985 | White | |
| 4,722,601 A | 2/1988 | McFarlane | |
| 5,031,330 A | 7/1991 | Stuart | |
| 5,181,040 A | 1/1993 | Inoue | |
| 5,438,404 A | 8/1995 | Hamilton et al. | |
| 5,619,323 A | 4/1997 | Hamilton et al. | |
| 5,672,872 A | 9/1997 | Wu | |
| 6,020,955 A | 2/2000 | Messina | |
| 6,122,538 A | 9/2000 | Sliwa, Jr. et al. | |
| 6,421,622 B1 * | 7/2002 | Horton et al. | 702/95 |
| 6,453,239 B1 * | 9/2002 | Shirasaka et al. | 701/508 |
| 6,681,629 B2 | 1/2004 | Foxlin | |
| 6,796,177 B2 * | 9/2004 | Mori | 73/504.02 |
| 6,853,947 B1 * | 2/2005 | Horton | 702/151 |
| 6,909,985 B2 | 6/2005 | Stana | |
| 7,065,888 B2 | 6/2006 | Jaklitsch et al. | |
| 7,120,522 B2 | 10/2006 | Kau | |
| 7,218,273 B1 | 5/2007 | Webster, Jr. | |
| 7,451,022 B1 | 11/2008 | Luk-Paszyc et al. | |
| 7,707,867 B2 * | 5/2010 | Babala et al. | 73/1.38 |
| 7,779,703 B2 * | 8/2010 | Veselovsky et al. | 73/862.041 |
| 7,798,453 B2 | 9/2010 | Maningo et al. | |
| 2005/0150121 A1 | 7/2005 | Jaklitsch et al. | |
| 2007/0150221 A1 * | 6/2007 | Babala et al. | 702/85 |
| 2009/0119937 A1 | 5/2009 | Watson | |
| 2009/0287451 A1 | 11/2009 | Sato et al. | |
| 2010/0332181 A1 * | 12/2010 | Jones et al. | 702/151 |

OTHER PUBLICATIONS

European Patent Office, "European Search Report", "from Foreign Counterpart of U.S. Appl. No. 11/925,440", Feb. 11, 2009, pp. 1-4, Published in: EP.
U.S. Patent and Trademark Office, "Advisory Action", "U.S. Appl. No. 11/925,440", Mar. 8, 2012, pp. 1-4.
U.S. Patent and Trademark Office, "Examiner's Answer", "U.S. Appl. No. 11/925,440", May 11, 2012, pp. 1-25.
U.S. Patent and Trademark Office, "Final Office Action", "U.S. Appl. No. 11/925,440", Jan. 24, 2012, pp. 1-24.
U.S. Patent and Trademark Office, "Office Action", "U.S. Appl. No. 11/925,440", Aug. 5, 2011, pp. 1-25.
"Assembly Drawing Transfer Alignment Tool, Model UG3100AA, Rev.E", Feb. 11, 1991, p. 1 of 1, Publisher: Honeywell International Inc.
Honeywell, "Honeywell Transfer Alignment System: UG5100", 2001, pp. 1-6.
"Transfer Alignment System", Jul. 23, 2007, pp. 1-2.
European Patent Office, "European Search Report", "from Foreign Counterpart of U.S. Appl. No. 13/693,278", Apr. 19, 2013, pp. 1-3, Published in: EP.
European Patent Office, "Office Action", "from Foreign Counterpart of U.S. Appl. No. 13/693,278", Oct. 23, 2013, pp. 1-7, Published in: EP.

* cited by examiner

FIELD INTERCHANGABLE BORESIGHT MOUNTING SYSTEM AND CALIBRATION METHOD

This application claims the benefit of priority to U.S. Provisional Application No. 61/567,279, filed on Dec. 6, 2011, which is incorporated by reference.

BACKGROUND

Boresighting is used to accurately align avionic equipment mounted on a frame of an aerial vehicle. Examples of avionic equipment that require accurate alignment include inertial reference systems, guidance systems, radars, and other sensor and weapon systems. In order to properly operate and control the avionic equipment, the equipment on the aerial vehicle is aligned with respect to a reference axis or coordinate frame.

The typical boresight alignment tool includes an angular sensor used to measure the relative difference from a datum point of the aircraft to a target point of the aircraft to be calibrated. In addition, if the aircraft is not held rigidly in place, some form of sensor is needed to correct for aircraft body movement.

A higher level of accuracy is required in aligning a boresighting device to a mounting surface to be calibrated than is possible with current mounting methods. One problem is that the boresighting device and mounting system must be calibrated to each other in a factory, and cannot be replaced in the field without losing the required accuracy. An additional problem is that a platform or surface on which any type of calibration might be made can wear with time or not have the required surface accuracy for the required calibration. A further problem occurs when local coriolis and gravitation effects are different from the location where the equipment was originally calibrated. Depending on the type of sensor used in the boresighting device, this can significantly degrade the accuracy of the device.

SUMMARY

A calibration method comprises providing a mounting fixture including a tray coupled to a frame, and an alignment measurement sensor removably coupled to the tray. An angular orientation of the tray is determined using the alignment measurement sensor removably coupled to the tray in a first position. The alignment measurement sensor is then moved to a second position on the tray that is rotated from the first position, and the angular orientation of the tray is determined using the alignment measurement sensor at the second position. An axis misalignment for at least two of a pitch axis, a roll axis, or a yaw axis of the alignment measurement sensor is then calculated to determine one or more misalignment factors. The one or more misalignment factors are then applied to correct for misalignment of the alignment measurement sensor.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
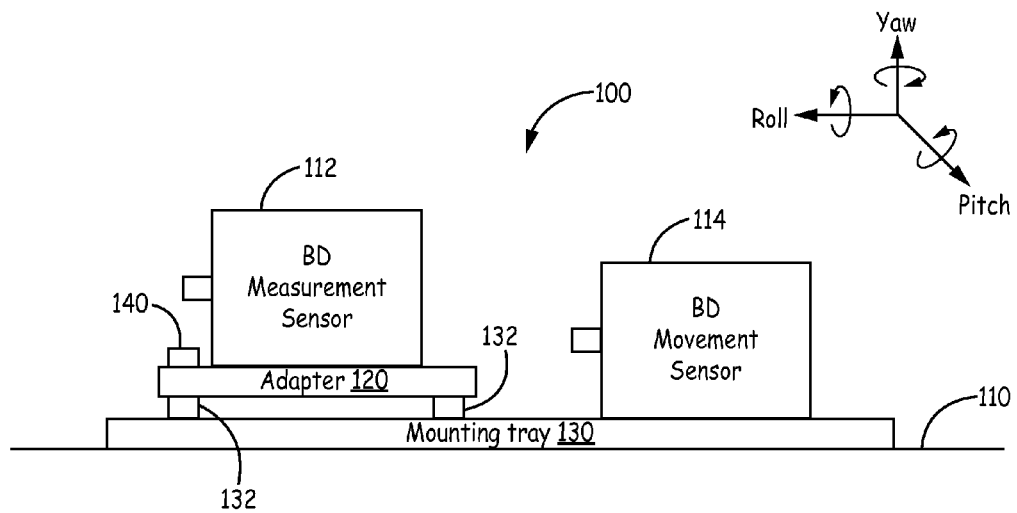
FIG. 1 is a side view of a boresight mounting system according to one embodiment.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawings and the specification is not to be construed as limiting the order in which the individual steps may be performed. The following detailed description is, therefore, not to be taken in a limiting sense.

A boresight mounting system and calibration method are provided. The system and method reduce errors that are static in nature due to mechanical misalignment and other conditions that affect the performance of any angular measurement device. Such errors include, but are not limited to, angular errors due to local gravity distortion conditions and internal boresighting device errors. These errors create a barrier to increasing the actual accuracy of an angular measurement device. Errors of this nature can be found in anything from a simple spirit level to a sophisticated inertial navigation unit. For the sake of discussion, the measurement device described herein is a Boresighting Device (BD). The described method can be performed in a poorly controlled field environment, where the ability to precisely mount and hold equipment is not available.

In one embodiment, a field interchangeable boresight mounting system with enhanced accuracy is provided. Misalignment errors in the boresight mounting system and specifically in the BD measurement sensor limit the ability to accurately boresight or align components to an aerial vehicle. The boresight mounting system includes a mounting fixture comprising a tray and optional adapter for mounting a BD to a vehicle. The mounting fixture allows the BD to be positioned at an arbitrary angle (0 degrees henceforth in this example) in the yaw axis, and rotated to 180 degrees in the yaw axis from the arbitrary starting angle.

An algorithm can be used to measure the actual adapter and BD misalignments in the other two axes of pitch and roll. The adapter allows the boresight mounting system to be more accurate and robust. The misalignments can be applied as corrections to the pitch, roll, and heading (yaw) outputs of the BD, electronically correcting for errors of the adapter and BD.

Moving the BD and adapter to 0 degrees yaw position and then back to the 180 degrees yaw position allows for detecting mounting variation. A voting process can also be implemented, where only measurements that have a high degree of correlation to the other measurements are used.

In addition, a computer programmed algorithm can be used in conjunction with the system disclosed in U.S. Patent Application Publication No. 2010/0332181, entitled SYSTEM AND METHOD FOR DETERMINING ANGULAR DIFFERENCES ON A POTENTIALLY MOVING OBJECT, the disclosure of which is incorporated by reference, where angular changes on both sensors in the system are correlated for near identical movement. If near identical movement is not detected, then the calibration process is rejected as this would indicate something is loose or unstable on the mounting fixture.

The present algorithm can be employed fully or approximately to calculate the measured differences in pitch, roll, and heading from the 0 degree position to the 180 degree position.

The mounting fixture can be designed with the required tolerances, or merely measured at the time of manufacture or periodic calibration for angular errors, and then corrected for in the present algorithm. This in turn allows for a high precision correction of an unknown angular error in the BD to mounting fixture.

The present approach can also be applied to any primary component that mounts to another surface in an uncontrolled mechanically unstable field application. The only requirement is for the system to have an angular measurement device accurately attached to the primary component, and another angular measurement device attached to the mounting fixture.

Figure 2:
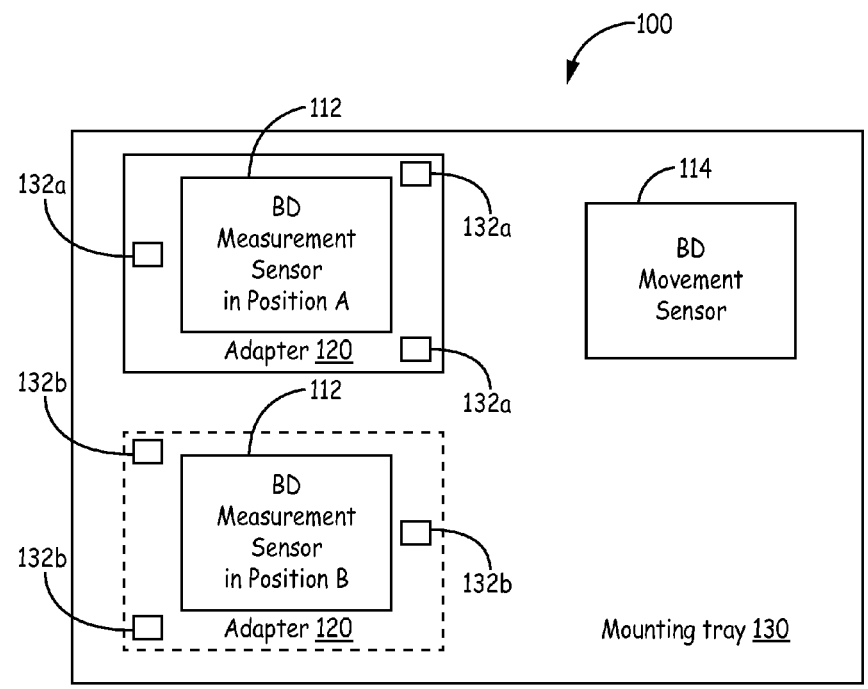
FIG. 2 is a top view of the boresight mounting system of FIG. 1.

FIGS. 1 and 2 depict a boresight mounting system 100 according to one embodiment, which is configured for coupling to a frame 110. This frame can be a desk or other mostly stable surface. These components described are for the calibration of the system and are not necessarily needed to be available for the system's boresighting mission. The mounting system 100 includes a frame alignment measurement sensor 112, and a frame movement sensor 114. The alignment measurement sensor 112 is optionally affixed to an adapter 120, which is removably coupled to a mounting tray 130 at a set of adapter contact points 132. The frame movement sensor 114 is affixed directly to mounting tray 130.

In one implementation, alignment measurement sensor 112 and movement sensor 114 each comprise a BD. Moreover, the BD can be a full navigation-grade strap down Inertial Reference Unit (IRU) with the highest permissible accuracy for gyroscopes. The measurement sensor 112 is configured to determine a reference position of the mounting tray at position A and position B (FIG. 2), and movement sensor 114 is configured for attitude measurement changes of mounting tray 130. One or more angular offset measurement devices 140 can be mounted on adapter 120 or on contact points 132 when the adapter is not used. The angular offset measurement devices 140 are used to measure the relative angular difference in both axes being calibrated between adapter 120 and adapter contact points 132 for positions A to B as shown in FIG. 2.

The measurement sensor 112 can be directly affixed to mounting tray 130, or to adapter 120 coupled to mounting tray 130 as needed. The adapter 120 provides desirable additional features such as repeatable adapter-tray mounting, reduced wear on the BD (which reduces system replacement costs), reduced susceptibility to contaminants and environmental factors that could affect mating/alignment, and can be imprecisely attached to the BD. As long as the misalignments are measured and applied after the mounting tray 130 and adapter 120 are attached, the unknown misalignments can be corrected by the method described hereafter with respect to FIG. 3. This allows for the BD and adapter to be field interchanged and re-calibrated.

A measurement system, such as described in U.S. Patent Application Publication No. 2010/0332181, can be used to measure the angular changes in measurement sensor 112. In addition, this measurement system can be used to correct for any movement that occurs with mounting tray 130 while moving the BD from its starting position to its rotated position.

The present method measures the total static angular errors by placing measurement sensor 112 in a first position (A) and orientation, and then moving sensor 112 to a second position (B) orientation with respect to the first position and orientation, as shown in FIG. 2. This can be done by removing adapter 120 with sensor 112 from mounting tray 130 at position A using mounting tray adapter points (132a), rotating adapter 120 a given amount, such as 180 degrees, and then reattaching adapter 120 with sensor 112 to mounting tray 130 at position B using the mounting tray adapter points (132b). This also changes the orientation of the mounting surfaces for relative angular offset measurement by angular offset measurement devices 140 in the same amount.

While a 180 degree rotation of sensor 112 is shown in FIG. 2, any amount of angular rotation of sensor 112 can be utilized in the present method.

Figure 3:
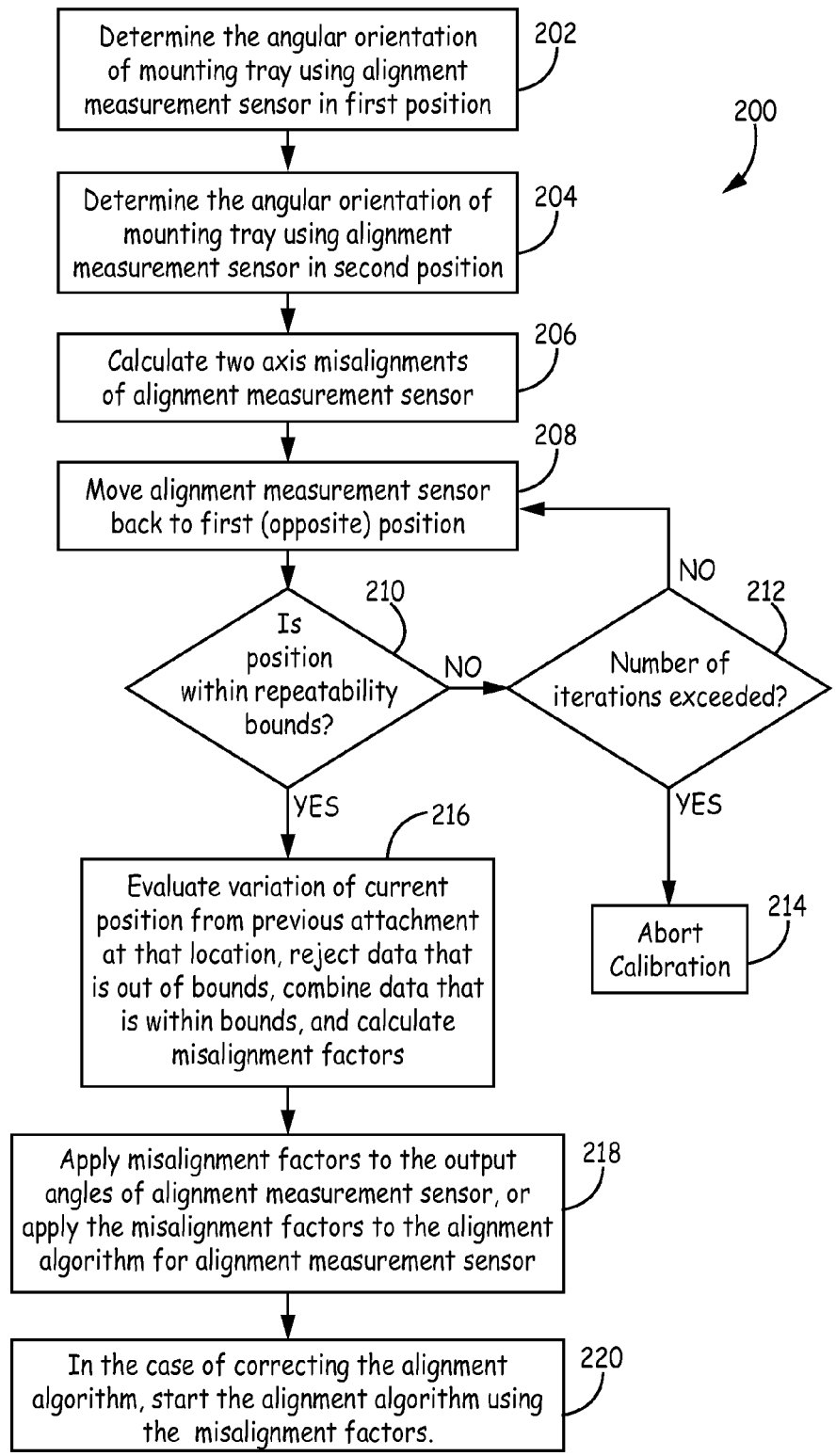
FIG. 3 is a flow diagram of a method for calibration according to one approach.

FIG. 3 is a flow diagram for a calibration method 200. At a starting first position, method 200 determines the angular orientation of a mounting tray using an alignment measurement sensor such as a BD in a first position (e.g., position A in FIG. 2) (block 202). Next, the angular orientation of the mounting tray is determined using the alignment measurement sensor in a second position (e.g., position B in FIG. 2) that is spaced apart and rotated from the first position (block 204). As long as the mounting tray remains in the same position, the static offset errors of the BD and the adapter that holds the BD in place if used, as well as misalignment errors of the mounting tray, will be observed by the relative changes in pitch and roll, from the starting first position to the second position.

The method 200 then calculates two axis misalignments of the alignment measurement sensor (block 206). For the case where the BD is rotated 180 degrees about a third axis, the two axis misalignments can be calculated by the following equation:

$$\text{axis misalignment}=(\text{axis@first position}+\text{axis@second position}+\text{relative angular offset error})/2;$$

where: "axis@x position" is either the pitch, roll, or yaw axis angle measured; "relative angular offset error" is the known difference in the fixtures misalignment axis, as well as the movement of surface 110 in FIG. 1 measured by the movement sensor. An angular movement algorithm can be applied for angles other than 180 degrees. If there are known errors in the mounting tray, then these errors can be mathematically removed by applying the relative angular offset error. As an extension of the present approach, more than two BD positions can be used in calculating each axis misalignment.

The alignment measurement sensor and adapter (if used) are then moved back to the first position (block 208). The repeated movement of the alignment measurement sensor when still attached to the adapter from the first position to the second position can be used to evaluate the fidelity of the mechanical mating. A determination is then made whether the position is within repeatability bounds (block 210). If not, the method determines whether a predetermined number of iterations is exceeded (block 212). If yes, the calibration method is aborted (block 214). If the iterations are not exceeded then the method repeats starting at block 208.

By evaluating if the adapter (if used) and BD are mounted within the statistical bounds of repeatability to the mounting tray, a decision can be made to evaluate all dynamic changes that occur to the mounting tray, adapter, or BD while the calibration process occurs. Evaluating this to a repeatability limit (bounds) for a limited number of trials (iterations) allows the calibration process to reject errors that occur due to external influences (e.g., dirt, temperature, etc.) as well as internal system based failures (e.g., mechanical wear, BD malfunction, etc.).

If the position is within repeatability bounds (block 210), the method evaluates the variation of the current position from previous attachments at that location, rejects data that is out of bounds, combines data that is within bounds, and calculates misalignment factors (block 216). For data gathered within the bounds of repeatability, a weighted value of each measurement of data at a given position can be employed to calculate each axis misalignment used for actual correction. The weight of each measurement used in the final answer can be based on environmental factors, such as known drift rates of the BD sensors, which are reduced in fidelity as the duration of time moves on.

The method 200 then corrects the device misalignment by applying the misalignment factors to the output angles of the alignment measurement sensor, or can apply the misalignment factors to an alignment algorithm for the alignment measurement sensor (block 218). In the case of correcting the alignment algorithm, the method starts the alignment algorithm using the calculated misalignment factors (block 220). The misalignment factors can be applied directly to any alignment or offset algorithm used by the BD, which intrinsically corrects the errors and eliminates errors from propagating into the pitch, roll, and heading outputs.

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include or function with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

Example Embodiments

Example 1 includes a calibration method, comprising providing a mounting fixture including a tray coupled to a frame, and an alignment measurement sensor removably coupled to the tray; determining an angular orientation of the tray using the alignment measurement sensor removably coupled to the tray in a first position; moving the alignment measurement sensor to a second position on the tray that is rotated from the first position; determining the angular orientation of the tray using the alignment measurement sensor at the second position; calculating an axis misalignment for at least two of a pitch axis, a roll axis, or a yaw axis of the alignment measurement sensor to determine one or more misalignment factors; and applying the one or more misalignment factors to correct for misalignment of the alignment measurement sensor.

Example 2 includes the method of Example 1, and further comprising moving the alignment measurement sensor back to the first position at least once from the second position; determining an average of data measurements taken by the alignment measurement sensor and whether a current position of the alignment measurement sensor is within repeatability bounds; if a resulting variation of the current position is within repeatability bounds, the average of the measurements is used as the misalignment factor; and if the resulting variation is outside of acceptable repeatability bounds, the measurements are rejected.

Example 3 includes the method of any of Examples 1-2, wherein the alignment measurement sensor comprises a boresighting device.

Example 4 includes the method of any of Examples 1-3, wherein each axis misalignment is calculated using a weighted value for each data measurement at a given position.

Example 5 includes the method of any of Examples 2-4, wherein if the current position is not within repeatability bounds, the method further comprising determining whether a predetermined number of iterations is exceeded; if the predetermined number of iterations is not exceeded, moving the alignment measurement sensor to the second position; and determining whether a then current position of the alignment measurement sensor is within repeatability bounds.

Example 6 includes the method of any of Examples 1-5, wherein the misalignment factors are applied to output angles of the alignment measurement sensor.

Example 7 includes the method of any of Examples 1-5, wherein the misalignment factors are applied to correct an alignment algorithm for the alignment measurement sensor by starting the alignment algorithm using the misalignment factors.

Example 8 includes the method of any of Examples 1-7, further comprising providing one or more angular offset measurement devices coupled to the tray.

Example 9 includes the method of any of Examples 1-8, wherein the mounting fixture further includes an adapter that removably couples the alignment measurement sensor to the tray.

Example 10 includes the method of Example 9, further comprising providing one or more angular offset measurement devices mounted on the adapter.

Example 11 includes the method of any of Examples 1-10, further comprising providing a frame movement sensor affixed to the tray.

Example 12 includes the method of Example 11, wherein the frame movement sensor comprises a boresighting device.

Example 13 includes a boresight mounting system, comprising a mounting fixture comprising a tray having an outer surface and configured to be attached to a frame; a frame movement sensor affixed to the outer surface of the tray, the frame movement sensor configured to determine attitude measurement changes of the tray; and an alignment measurement sensor removably coupled to the outer surface of the tray, the alignment measurement sensor configured to determine a first reference position of the tray while the alignment measurement sensor is at a first position and orientation, the alignment measurement sensor configured to determine a second reference position of the tray when the alignment measurement sensor is at a second position and orientation that is rotated from the first position and orientation.

Example 14 includes the system of Example 13, further comprising one or more angular offset measurement devices coupled to the outer surface of the tray.

Example 15 includes the system of any of Examples 13-14, wherein the mounting fixture further comprises an adapter that removably couples the alignment measurement sensor to the tray.

Example 16 includes the system of Example 15, further comprising one or more angular offset measurement devices mounted on the adapter.

Example 17 includes the system of any of Examples 13-16, wherein the frame movement sensor comprises a boresighting device.

Example 18 includes the system of any of Examples 13-17, wherein the alignment measurement sensor comprises a boresighting device.

Example 19 includes a computer program product, comprising a non-transitory computer readable medium having instructions stored thereon executable by a processor to perform a calibration method, comprising determining an angular orientation of a tray coupled to a frame based on data from a frame alignment measurement sensor removably coupled to the tray in a first position and orientation; determining the angular orientation of the tray based on data from the alignment measurement sensor after being moved to a second position and orientation on the tray that is spaced apart and rotated from the first position and orientation; calculating an axis misalignment for at least two of a pitch axis, a roll axis, or a yaw axis of the alignment measurement sensor to determine one or more misalignment factors; and applying the one or more misalignment factors to output angles of the frame alignment measurement sensor to correct for misalignment of the frame alignment measurement sensor.

Although specific embodiments have been illustrated and described herein, it will be appreciated by those of ordinary skill in the art that any arrangement, which is calculated to achieve the same purpose, may be substituted for the specific embodiments shown. The described embodiments are to be considered in all respects only as illustrative and not restrictive. Therefore, it is intended that this invention be limited only by the claims and the equivalents thereof.

What is claimed is:

1. A calibration method, comprising:
   providing a mounting fixture including a tray coupled to a frame, and an alignment measurement sensor removably coupled to the tray;
   determining a first reference position of the tray using the alignment measurement sensor removably coupled to the tray in a first position and orientation;
   moving the alignment measurement sensor to a second position and orientation on the tray that is rotated from the first position and orientation;
   determining a second reference position of the tray using the alignment measurement sensor at the second position and orientation;
   calculating an axis misalignment for at least two of a pitch axis, a roll axis, or a yaw axis of the alignment measurement sensor to determine one or more misalignment factors, wherein the axis misalignment is calculated as:

$$\text{axis misalignment} = (\text{axis@first position} + \text{axis@second position} + \text{relative angular offset error})/2;$$

where the axis@first position and the axis@second position include measured angles of the pitch axis, the roll axis, or the yaw axis; and applying the one or more misalignment factors to correct for misalignment of the alignment measurement sensor.

2. The method of claim 1, further comprising:
   moving the alignment measurement sensor back to the first position at least once from the second position;
   determining an average of data measurements taken by the alignment measurement sensor and whether a current position of the alignment measurement sensor is within repeatability bounds;
   if a resulting variation of the current position is within repeatability bounds, the average of the data measurements is used as the misalignment factor; and
   if the resulting variation is outside of acceptable repeatability bounds, the measurements are rejected.

3. The method of claim 1, wherein the alignment measurement sensor comprises a boresighting device.

4. The method of claim 1, wherein each axis misalignment is calculated using a weighted value for each data measurement at a given position.

5. The method of claim 2, wherein if the current position is not within repeatability bounds, the method further comprising:
   determining whether a predetermined number of iterations is exceeded;
   if the predetermined number of iterations is not exceeded, moving the alignment measurement sensor to the second position; and
   determining whether a then current position of the alignment measurement sensor is within repeatability bounds.

6. The method of claim 1, wherein the misalignment factors are applied to output angles of the alignment measurement sensor.

7. The method of claim 1, wherein the misalignment factors are applied to correct an alignment algorithm for the alignment measurement sensor by starting the alignment algorithm using the misalignment factors.

8. The method of claim 1, further comprising providing one or more angular offset measurement devices coupled to the tray.

9. The method of claim 1, wherein the mounting fixture further includes an adapter that removably couples the alignment measurement sensor to the tray.

10. The method of claim 9, further comprising providing one or more angular offset measurement devices mounted on the adapter.

11. The method of claim 1, further comprising providing a frame movement sensor affixed to the tray.

12. The method of claim 11, wherein the frame movement sensor comprises a boresighting device.

13. A boresight mounting system, comprising:
    a mounting fixture comprising a tray having an outer surface and configured to be attached to a frame;
    a frame movement sensor affixed to the outer surface of the tray;
    an alignment measurement sensor removably coupled to the outer surface of the tray; and
    a processor configured to execute instructions stored on a non-transitory processor readable medium to perform a calibration method comprising:
      determining a first reference position of the tray attached to the frame based on data from the alignment measurement sensor in a first position and orientation;
      determining a second reference position of the tray based on data from the alignment measurement sensor after being moved to a second position and orientation on the tray that is spaced apart and rotated from the first position and orientation:

calculating an axis misalignment for at least two of a pitch axis, a roll axis, or a yaw axis of the alignment measurement sensor to determine one or more misalignment factors, wherein the axis misalignment is calculated as:

$$\text{axis misalignment} = (\text{axis@first position} + \text{axis@second position} + \text{relative angular offset error})/2;$$

where the axis@first position and the axis@second position include measured angles of the pitch axis, the roll axis, or the yaw axis; and applying the one or more misalignment factors to correct for misalignment of the alignment measurement sensor.

14. The system of claim 13, further comprising one or more angular offset measurement devices coupled to the outer surface of the tray.

15. The system of claim 13, wherein the mounting fixture further comprises an adapter that removably couples the alignment measurement sensor to the tray.

16. The system of claim 15, further comprising one or more angular offset measurement devices mounted on the adapter.

17. The system of claim 13, wherein the frame movement sensor comprises a boresighting device.

18. The system of claim 13, wherein the alignment measurement sensor comprises a boresighting device.

19. A computer program product, comprising:

a non-transitory computer readable medium having instructions stored thereon executable by a processor to perform a calibration method, comprising:

determining a first reference position of a tray coupled to a frame based on data from a frame alignment measurement sensor removably coupled to the tray in a first position and orientation;

determining a second reference position of the tray based on data from the alignment measurement sensor after being moved to a second position and orientation on the tray that is spaced apart and rotated from the first position and orientation;

calculating an axis misalignment for at least two of a pitch axis, a roll axis, or a yaw axis of the alignment measurement sensor, wherein the axis misalignment is calculated as:

$$\text{axis misalignment} = (\text{axis@first position} + \text{axis@second position} + \text{relative angular offset error})/2;$$

where the axis@first position and the axis@second position include measured angles of the pitch axis, the roll axis, or the yaw axis;

determining an average of data measurements taken by the alignment measurement sensor;

determining one or more misalignment factors from the average of the data measurements; and applying the one or more misalignment factors to output angles of the alignment measurement sensor to correct for misalignment of the alignment measurement sensor.

20. The method of claim 1, wherein the alignment measurement sensor at the second position and orientation is rotated about 180 degrees relative to the first position and orientation.

* * * * *